(12) United States Patent
Metz

(10) Patent No.: US 9,988,975 B2
(45) Date of Patent: Jun. 5, 2018

(54) EXHAUST-GAS TURBOCHARGER

(71) Applicant: BorgWarner Inc., Auburn Hills, MI (US)

(72) Inventor: Dietmar Metz, Meckenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 55 days.

(21) Appl. No.: 14/771,947

(22) PCT Filed: Feb. 28, 2014

(86) PCT No.: PCT/US2014/019374
§ 371 (c)(1),
(2) Date: Sep. 1, 2015

(87) PCT Pub. No.: WO2014/163969
PCT Pub. Date: Oct. 9, 2014

(65) Prior Publication Data
US 2016/0010542 A1    Jan. 14, 2016

(30) Foreign Application Priority Data

Mar. 11, 2013 (DE) .................. 10 2013 004 235

(51) Int. Cl.
*F02B 37/24* (2006.01)
*F01D 17/16* (2006.01)
(Continued)

(52) U.S. Cl.
CPC ............ *F02B 37/24* (2013.01); *F01D 5/02* (2013.01); *F01D 17/16* (2013.01); *F01D 17/165* (2013.01);
(Continued)

(58) Field of Classification Search
CPC . F02B 37/24; F01D 5/02; F01D 17/16; F01D 17/165; F01D 25/16
(Continued)

(56) References Cited

U.S. PATENT DOCUMENTS

2010/0014961 A1   1/2010  Boning et al.
2010/0202874 A1   8/2010  Hayashi et al.
(Continued)

FOREIGN PATENT DOCUMENTS

EP   1564380 A1 *   8/2005  ........... F01D 17/165
WO  WO 2011146555 A2 * 11/2011  ........... F01D 17/165
(Continued)

OTHER PUBLICATIONS

International Search Report and Written Opinion in International Application No. PCT/US2014/019374, dated Jun. 3, 2014.

*Primary Examiner* — Patrick Maines
(74) *Attorney, Agent, or Firm* — Eric L. Doyle; Stephan A. Pendorf; Patent Central LLC

(57) ABSTRACT

An exhaust-gas turbocharger (1) having a turbine (2) which has a turbine wheel (3) surrounded by an inflow duct (4), and having a VTG cartridge (5), which VTG cartridge has a disk (6) and a vane bearing ring (7), which delimit the inflow duct (4), and which VTG cartridge has a multiplicity of vanes (8) which are arranged in the inflow duct (4) and which are mounted in the vane bearing ring (7) by way of rotatable vane shafts (9), which vane shafts are connected to vane levers (10), the lever heads (11) of which engage into associated grooves (12) in an adjusting ring (13) which surrounds the vane bearing ring (7) on the outside. At least one min-flow stop (25, 26) has, on an outer surface (31), a laser-cut portion (32).

8 Claims, 5 Drawing Sheets

Figure 1:
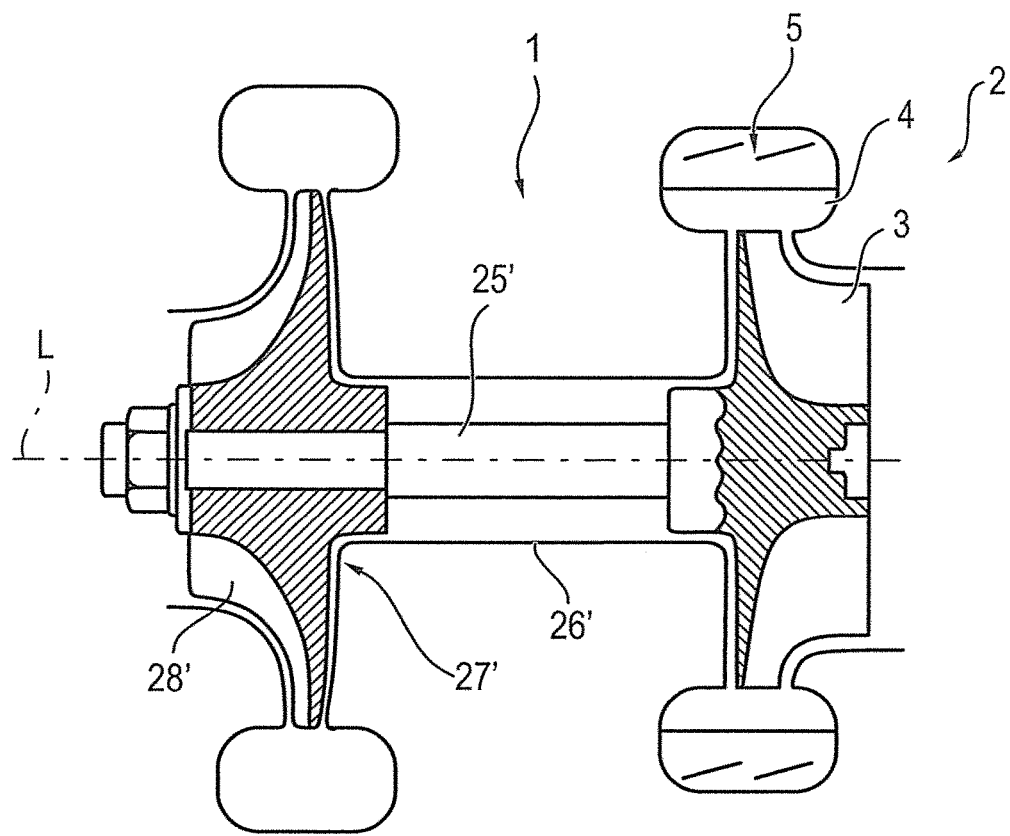

(51) Int. Cl.
*F01D 5/02* (2006.01)
*F01D 25/16* (2006.01)
*F02B 33/40* (2006.01)

(52) U.S. Cl.
CPC .............. *F01D 25/16* (2013.01); *F02B 33/40* (2013.01); *F05D 2220/40* (2013.01); *Y02T 10/144* (2013.01)

(58) Field of Classification Search
USPC ............................................. 415/159; 60/608
See application file for complete search history.

(56) References Cited

U.S. PATENT DOCUMENTS

2010/0282551 A1   11/2010  Ruopp et al.
2010/0310359 A1*  12/2010  Valin ..................... F01D 17/165
                                                                                          415/160
2011/0123316 A1*   5/2011  Roberts ................ F01D 17/167
                                                                                          415/160
2012/0247881 A1   10/2012  Root et al.
2015/0132112 A1*   5/2015  Metz ..................... F01D 17/165
                                                                                         415/159
2015/0292350 A1*  10/2015  Metz ....................... F02B 37/24
                                                                                         415/148

FOREIGN PATENT DOCUMENTS

WO         2012047527 A2    4/2012
WO    WO 2012047527 A2 *   4/2012    ........... F01D 17/165

* cited by examiner

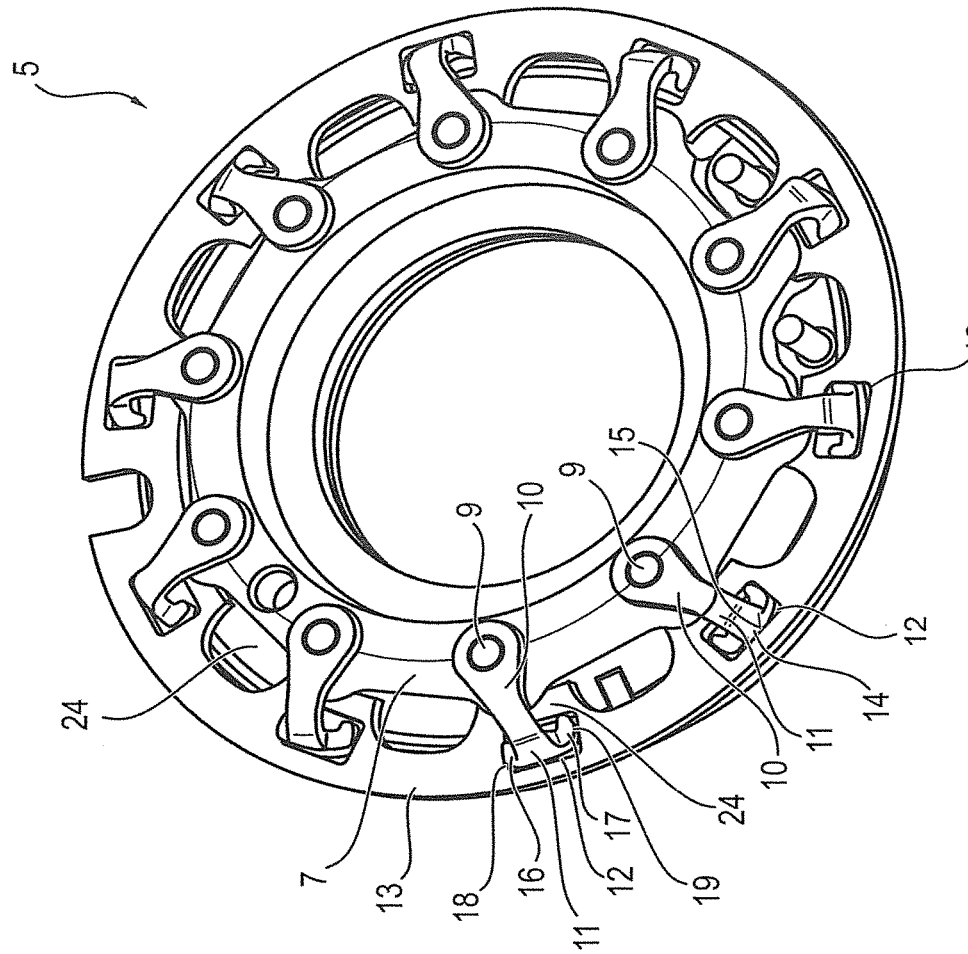
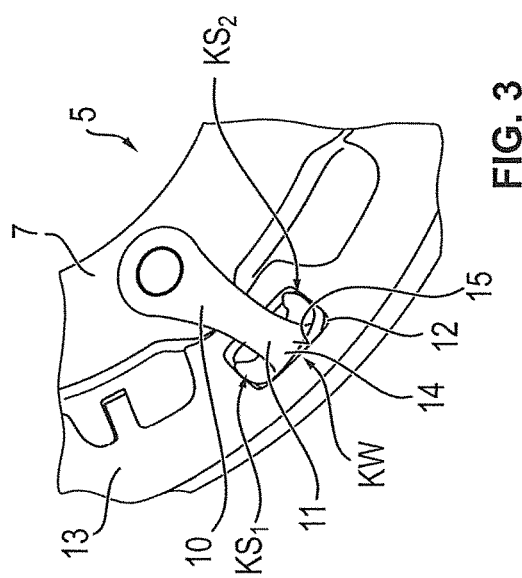
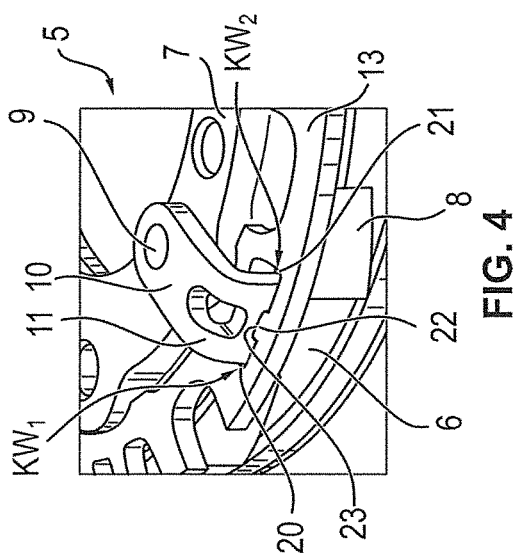

EXHAUST-GAS TURBOCHARGER

The invention relates to an exhaust-gas turbocharger according to the preamble of claim 1.

In the case of such an exhaust-gas turbocharger, provision is made of a variable turbine geometry (VTG), in which guide vanes are adjusted by means of an adjusting ring. When an exhaust-gas turbocharger of said type with a variable turbine geometry is used in a vehicle, it is highly crucial to attain precise calibration, which remains stable over the service life of the engine, of the lowest possible exhaust-gas throughput ("min-flow throughput").

In this regard, it is an object of the present invention to provide an exhaust-gas turbocharger of the type indicated in the preamble of claim 1 which permits precise calibration, which remains stable over the service life of the turbocharger, of the lowest possible exhaust-gas throughput.

This object is achieved by the features of claim 1.

It is achieved in this way that the stop can be provided with a highly precise cut portion, even at poorly accessible locations, because the cut portion is in the form of a laser-cut portion. It is thus possible to perform precise setting of the throughput, or also a recalibration, of the VTG cartridge of the exhaust-gas turbocharger according to the invention.

The provision of a laser-cut portion offers particular advantages in the case of stops such as pins or stop bolts which have a round external form, on which a planar laser-cut portion can be formed for the purposes of the calibration process.

Dependent claims 2 to 5 relate to advantageous developments of the exhaust-gas turbocharger according to the invention.

Tests performed within the context of the invention have shown that the throughput through the variable turbine geometry is dependent not only on the provision of a stop but also on the mounting of the adjusting ring and in particular on the magnitude of the radial play in said mounting.

Therefore, according to the invention, use is made of two min-flow stops which are preferably arranged at the greatest possible distance from the inner lever of the variable turbine geometry and which yield the advantage that the angular position of the adjusting ring in the position at the min-flow stop is precisely defined owing to small radial deflection, and any wear on the adjusting ring bearing no longer has an influence on the lowest possible exhaust-gas throughput (min-flow throughput).

It is preferable for the two min-flow stops provided according to the invention to have parallel stop edges, such that, at the min-flow stop, the adjusting ring is subjected to definite constriction in terms of its freedom of movement.

Any other remaining possible displacements then no longer result in a change in throughput, or no longer result in a significant change in throughput.

Accordingly, to set a throughput through a VTG cartridge of an exhaust-gas turbocharger, or else for recalibration of a cartridge of said type, at least one min-flow stop is mounted in the VTG cartridge at a suitable position. Said position may be provided on the vane bearing ring or else on the adjusting ring.

For the purposes of setting the throughput through the VTG cartridge, a laser-cut portion is then formed on the outer surface of the stop, said laser-cut portion being very precise, such that the setting of the throughput, or recalibration, is also correspondingly precise.

By means of a laser process of said type, it is also possible for a planar cut portion to be formed on round stops.

Figure 5:
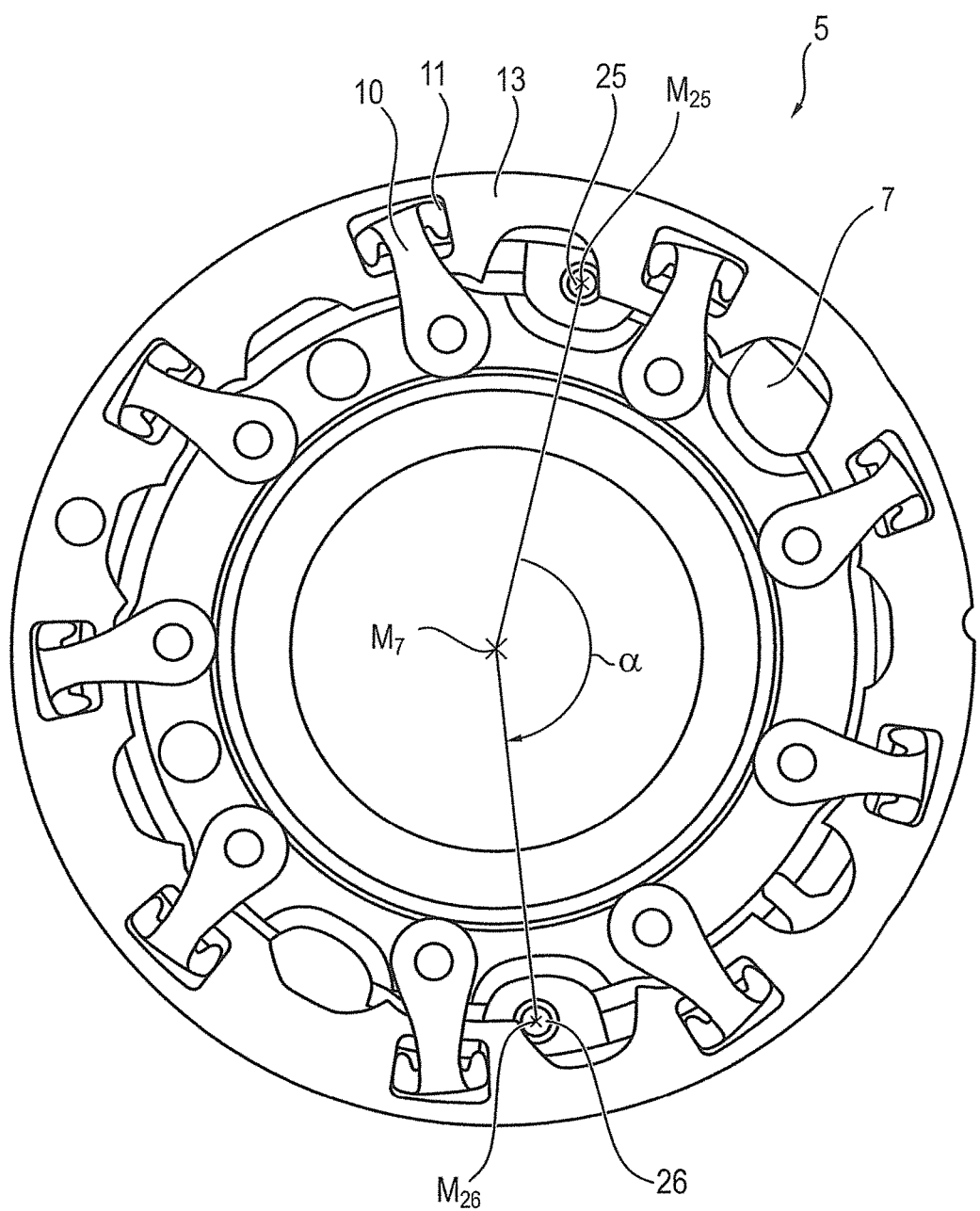
Figure 6:
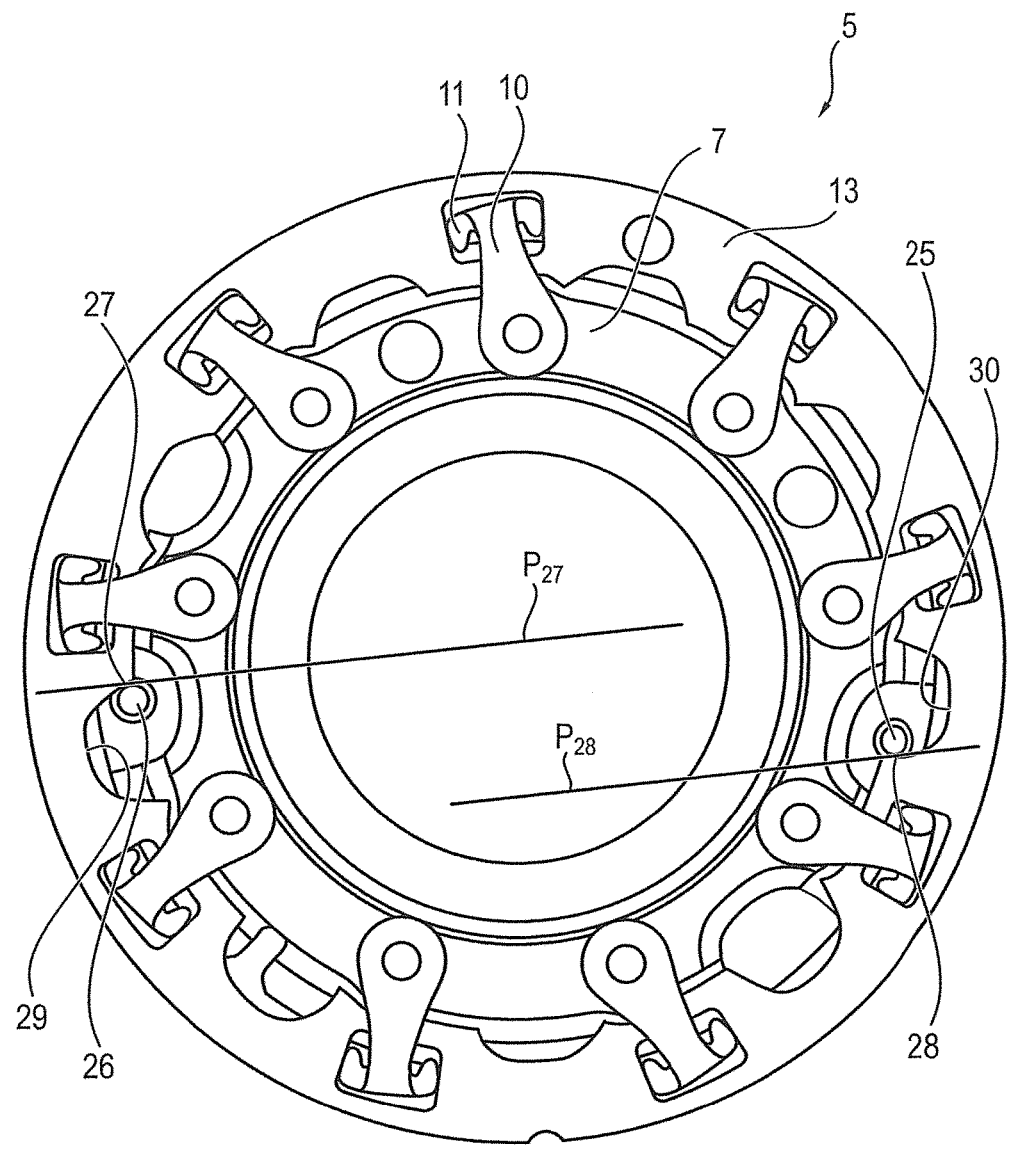
Figure 7:
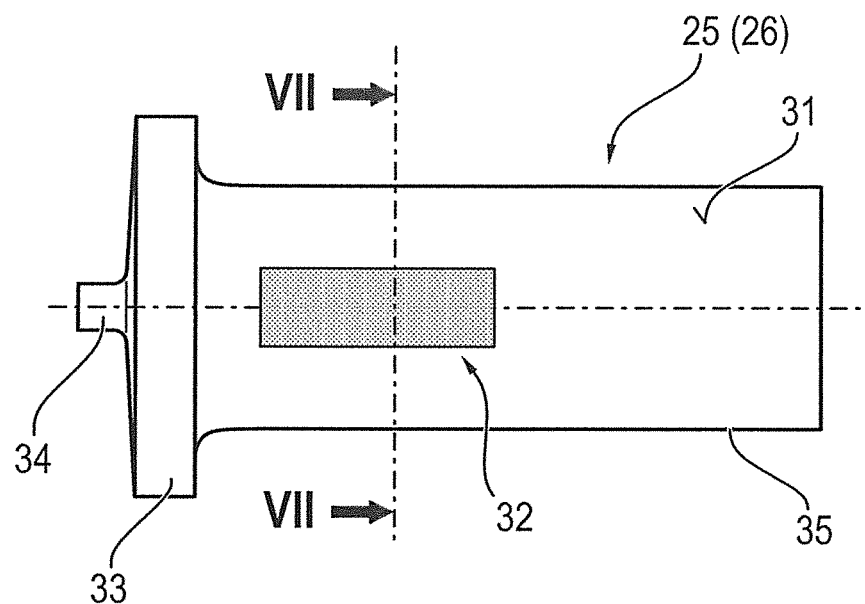
Figure 8:
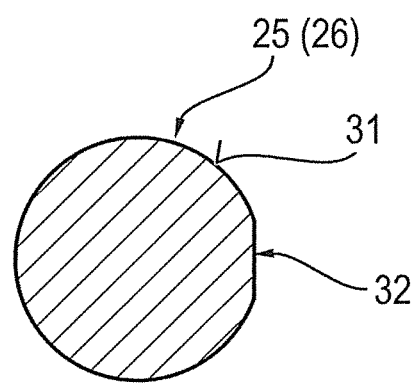

Further details, features and advantages of the invention become apparent from the following description of exemplary embodiments with reference to the drawing, in which:

FIG. 1 shows a schematically greatly simplified illustration of an exhaust-gas turbocharger according to the invention, FIG. 2 shows a perspective plan view of a VTG cartridge, FIG. 3 shows an enlarged partial view of the VTG cartridge according to FIG. 2, FIG. 4 shows a partial illustration, corresponding to FIG. 3, of a VTG cartridge (stops not visible), FIG. 5 shows a view from below of the VTG cartridge according to the invention, FIG. 6 shows a view from below, corresponding to FIG. 5, of the VTG cartridge according to the invention, for explaining the parallel configuration of stop edges, FIG. 7 shows an enlarged illustration of a plan view of a min-flow stop, and FIG. 8 shows a sectional illustration of the stop as per FIG. 7 along the line VII-VII in FIG. 7.

FIG. 1 shows a schematically greatly simplified basic illustration of an exhaust-gas turbocharger 1 according to the invention, which has a charger axis of rotation L.

The exhaust-gas turbocharger 1 also has a turbine 2, which comprises a turbine wheel 3 surrounded by an inflow duct 4 which is provided with a so-called VTG cartridge 5. This VTG cartridge 5 will be described in detail hereinbelow with reference to FIGS. 2 to 4.

The exhaust-gas turbocharger 1 also of course has all the other common parts of an exhaust-gas turbocharger, such as a rotor 25', which is mounted rotatably in a bearing housing 26' and which bears the turbine wheel 3 at one end and a compressor wheel 28' of a compressor 27' at the other end. These parts are likewise shown only in schematically greatly simplified form in FIG. 1, since they are not of importance for explaining the principles of the present invention.

The VTG cartridge, which, as mentioned, will be explained in detail hereinbelow with reference to FIGS. 2 to 4, is likewise shown in greatly schematically simplified form.

A VTG cartridge is understood to mean a structural unit which, between a vane bearing ring 7 and a disk 6, delimits an inflow duct 4 for the passage of exhaust gases to the turbine wheel 3. Furthermore, a VTG cartridge of this type has a plurality of vanes, which are arranged in the inflow duct 4 and of which FIG. 4 shows one vane designated 8 as a representative example of all vanes bearing the corresponding reference numeral. The vanes 8 can be moved rotatably in the vane bearing ring 7 between a closed and an open position. For this purpose, the vanes 8 have vane shafts 9 each having an axis of rotation. The vane shafts 9 in turn are connected to vane levers 10, of which two vane levers are denoted in each case in FIG. 2 with the reference numeral 10. As FIG. 2 shows, the embodiment shown there has ten such preferably cranked vane levers, in each case of identical design.

Each vane lever 10 has a lever head 11, which engages into an associated groove 12 in an adjusting ring 13. FIG. 2 shows in this respect that the adjusting ring 13 surrounds the vane bearing ring 7 on the outside, i.e. along the outer circumference thereof.

For the radial mounting of the adjusting ring 13, a radial bearing arrangement may be provided which is formed by the vane levers 10. For this purpose, the vane levers 10 are formed as rolling levers, the lever heads 11 of which are supported in the grooves 12 in the adjusting ring 13.

In FIGS. 2 and 3, the lever heads 11 are provided with end faces 14 each with a rounded form. These rounded end faces 14 are in rolling contact with a counterface 15 of the respectively associated groove 12, this rolling contact being symbolized by the arrow KW in FIG. 3.

In the embodiment shown in FIGS. 2 and 3, the counterface 15 of the grooves has a planar form in each case.

The two further arrows $KS_1$ and $KS_2$ in FIG. 3 show lateral contact points between the lever head 11 and the respectively associated groove 12. These contact points $KS_1$ and $KS_2$ arise between side walls 16 and 17 of the lever heads 11 and the corresponding associated side walls 18 and 19 of the grooves 12, these side walls 18 and 19 each adjoining the counterface 15. As shown in FIG. 2, the grooves 12 are each closed by a rear wall 24, which in turn adjoins the side walls 18 and 19 and runs substantially parallel to the counterface 15.

FIG. 4 shows an embodiment in which the preferably cranked vane levers 10 are in turn in the form of cam levers, the lever heads 11 of which are supported in the grooves 12, but this support being provided at lateral rolling bearing support points $KW_1$ and $KW_2$, as is evident in detail from FIG. 4. These rolling bearing support points $KW_1$ and $KW_2$ of the lever heads 11 are supported on edge regions 20, 21 of the grooves 12, as is likewise evident from FIG. 4.

Furthermore, the lever heads 11 in this embodiment each have a central recess 23, into which an associated lug 22 of the adjusting ring 13 engages, as a result of which the force is transmitted for the adjustment of the vanes.

It is common to both embodiments that the vane levers 10 are each in the form of preferably cranked levers and can be produced in the form of stamped or formed parts.

Furthermore, in both embodiments the adjusting ring 13 is axially mounted by way of the vane bearing ring 7. For this purpose, the vane bearing ring 7 has bearing segments 24 (see FIG. 2), which rest on the adjusting ring 13.

FIG. 5 shows a perspective view from below of the VTG cartridge 5 according to the invention, said view showing the arrangement of, in the example, two stops 25, 26 for setting the lowest possible throughput through the cartridge 5, said stops 25 and 26 normally being referred to as "min-flow stops".

As shown in FIG. 5, the min-flow stops 25 and 26 are arranged on the vane bearing ring 7 in this embodiment. As viewed from the central point $M_7$ of the vane bearing ring 7 to the central points $M_{25}$ and $M_{26}$ of the min-flow stops, said min-flow stops 25 and 26 enclose an angle α with respect to one another, which angle may be freely selected from a design aspect in accordance with structural conditions or other demands. In principle, however, a stop 25, 26 is also conceivable which may be mounted in the VTG cartridge at some other suitable location. According to FIGS. 7 and 8, a stop 25, 26 of said type may be in the form of a stop bolt, which in the example has a cylindrical pin portion 35 with a round outer surface 31. By means of a laser machining process, a laser-cut portion 32 is formed on said outer surface 31, which laser-cut portion has a rectangular form in the example, as per the illustration in FIG. 7.

As shown in FIG. 8, the laser-cut portion 32 is of planar form, by contrast to the round outer surface 31.

The stop 25, 26 also has a fastening plate 33 which is of larger diameter than the stop section 35 and which has an insertion pin 34.

In a further embodiment illustrated in FIG. 6, the stop edges 27, 28 on the adjusting ring 13 are formed so as to be parallel, such that, when they make contact with the min-flow stops 25, 26, no significant radial deflection of the adjusting ring 13 is generated and thus the coaxial position with respect to the vane bearing ring 7 is maintained. Here, the stop edges 27 and 28 are those stop edges of the adjusting ring recess 29 and 30 respectively which come into contact with the min-flow stops 25 and 26 respectively, as can be seen in detail from FIG. 6. The parallel configuration of said stop edges 27 and 28 is indicated in FIG. 6 by the parallel lines $P_{27}$ and $P_{28}$.

In addition to the above written disclosure, reference is hereby explicitly made to the illustrative representation of the invention in FIGS. 1 to 8 to supplement the disclosure of the invention.

LIST OF REFERENCE SIGNS

1 Exhaust-gas turbocharger
2 Turbine
3 Turbine wheel
4 Inflow duct
5 VTG cartridge
6 Disk
7 Vane bearing ring
8 Vanes
9 Vane shafts
10 Vane levers
11 Lever heads
12 Grooves
13 Adjusting ring
14 Rounded end faces
15 Counterface
16, 17 Side walls
18, 19 Side walls
20, 21 Edge regions
22 Lug
23 Recess
24 Bearing segment
25, 26 Min-flow stops
25' Shaft
26' Bearing housing
27, 28 Stop edges
27' Compressor
28' Compressor housing
29, 30 Adjusting ring recesses
31 Outer surface
32 Laser-cut portion
33 Fastening plate
34 Fastening pin
$KS_1$ and $KS_2$ Lateral contact points for the adjustment of the vanes
KW Contact point for rolling bearing
$KW_1$ and $KW_2$ Contact points for rolling bearing
L Charger longitudinal axis
$M_7$ Central point of the vane bearing ring
$M_{25,\ 26}$ Central points of the min-flow stops
$P_{27}$, $P_{28}$ Parallel lines

The invention claimed is:

1. A method for setting the minimum flow (min-flow) throughput through a VTG cartridge (5) of an exhaust-gas turbocharger (1), comprising the following method steps:
assembling a VTG cartridge (5) with a multiplicity of vanes (8) mounted in a vane bearing ring (7) via rotatable vane shafts (9), wherein the rotatable vane shafts (9) are connected to vane levers (10) having lever heads (11) engaging into associated grooves (12) in an adjusting ring (13) such that rotation of said adjusting ring (13) acts on the vane levers (10) to rotate the vanes (8) between a min-flow position and a maximum open position;

mounting at least one min-flow stop (25, 26) in the VTG cartridge (5) to stop the adjusting ring (13);

precisely calibrating the lowest possible throughput through the VTG cartridge (5) by forming a laser-cut portion on the outer surface of the stop such that said min-flow stop (25, 26) stops said adjusting ring (13) with the vanes (8) in the intended min-flow position.

2. The method as claimed in claim 1, wherein cutouts (29, 30) of the adjusting ring (13), in the region of contact with the min-flow stop (25, 26), have parallel stop edges (27, 28).

3. The method as claimed in claim 1, having a radial bearing arrangement between the adjusting ring (13) and the vane bearing ring (7).

4. The method as claimed in claim 3, wherein the radial bearing between the adjusting ring (13) and the vane bearing ring (7) is formed by the vane levers (10), which vane levers (10) are formed as rolling levers, and wherein the lever heads (11) are supported in the grooves (12) in the adjusting ring (13).

5. The method as claimed in claim 3, wherein the radial bearing between the adjusting ring (13) and the vane bearing ring (7) is formed by the vane levers (10) which vane levers (10) are formed as rolling levers, and wherein the lever heads (11) are supported in the grooves (12) in the adjusting ring (13).

6. The method as claimed in claim 1, wherein two min-flow stops (25, 26) are provided arranged on the vane bearing ring (7) with a selectable angular spacing ($\alpha$) with respect to one another.

7. The method as claimed in claim 1, wherein the min-flow stop (25, 26) is a round stop bolt, and wherein the cut portion (32) is a planar portion on a round outer surface (31) of the min-flow stop (25, 26).

8. The method as claimed in claim 1, wherein cutouts (29, 30) of the adjusting ring (13), in the region of contact with the min-flow stop (25, 26), have parallel stop edges (27, 28).

* * * * *